(12) United States Patent
Singh

(10) Patent No.: US 11,568,471 B2
(45) Date of Patent: Jan. 31, 2023

(54) SYSTEMS AND METHODS FOR LISTING AN ITEM

(71) Applicant: OLX Global B.V., Hoofddorp (NL)

(72) Inventor: Jasjit Singh, New Delhi (IN)

(73) Assignee: OLX GLOBAL B.V., Hoofddorp (NL)

( * ) Notice: Subject to any disclaimer, the term of this patent is extended or adjusted under 35 U.S.C. 154(b) by 250 days.

(21) Appl. No.: 16/562,746

(22) Filed: Sep. 6, 2019

(65) Prior Publication Data

US 2021/0073894 A1   Mar. 11, 2021

(51) Int. Cl.
*G06Q 30/00* (2012.01)
*G06Q 30/06* (2012.01)

(52) U.S. Cl.
CPC ..... *G06Q 30/0633* (2013.01); *G06Q 30/0603* (2013.01); *G06Q 30/0605* (2013.01)

(58) Field of Classification Search
CPC ............... G06Q 30/00; G06Q 30/0601; G06Q 30/0631; G06Q 30/0641; G06Q 30/0643
See application file for complete search history.

(56) References Cited

U.S. PATENT DOCUMENTS

| | | | | |
|---|---|---|---|---|
| 7,493,274 B2* | 2/2009 | Bezos | ..................... | G06Q 30/02 235/383 |
| 9,558,479 B1* | 1/2017 | Orr | ........................ | H04M 15/48 |
| 2003/0158796 A1* | 8/2003 | Balent | ..................... | G06Q 30/06 705/28 |
| 2003/0204449 A1* | 10/2003 | Kotas | ..................... | G06Q 30/02 707/781 |
| 2007/0239552 A1* | 10/2007 | Sundaresan | ............ | G06Q 10/10 705/26.7 |
| 2008/0226119 A1* | 9/2008 | Candelore | ........... | G06F 16/7844 382/100 |
| 2008/0279481 A1* | 11/2008 | Ando | ..................... | G06F 16/532 705/26.1 |
| 2009/0006151 A1* | 1/2009 | Zarghami | ........... | G06Q 30/0202 705/7.29 |
| 2009/0063307 A1* | 3/2009 | Groenovelt | .......... | G06Q 10/087 705/28 |
| 2009/0128335 A1* | 5/2009 | Leung | ................ | G06Q 30/0207 705/14.1 |
| 2010/0046842 A1* | 2/2010 | Conwell | ............ | H04N 1/00307 382/218 |
| 2011/0221657 A1* | 9/2011 | Haddick | ................. | G06F 3/012 359/554 |

(Continued)

OTHER PUBLICATIONS

Soler, David, et al. "Calculation of the elastic demand curve for a day-ahead secondary reserve market." IEEE Transactions on Power Systems 25.2 (2009): 615-623. (Year: 2009).*

*Primary Examiner* — Christopher B Seibert
(74) *Attorney, Agent, or Firm* — Buckley, Maschoff & Talwalker LLC

(57) ABSTRACT

Pursuant to some embodiments, systems, methods, apparatus and computer program code are provided to create a listing data record which include analyzing an item data record to identify item details, a user, and at least a first listing rule, determining that a degree of demand for the item exceeds a threshold, determining that the at least first listing rule is satisfied, and converting the item data record into a listing data record allowing the listing record to be viewed by a plurality of users interested in the item. The item details may be obtained from a point of sale device or a user device operated by the user.

20 Claims, 9 Drawing Sheets

(56) References Cited

U.S. PATENT DOCUMENTS

| | | | |
|---|---|---|---|
| 2012/0246007 A1* | 9/2012 | Williams | G06Q 30/02 705/14.66 |
| 2012/0290366 A1* | 11/2012 | Giles | G06Q 40/02 705/14.1 |
| 2013/0179303 A1* | 7/2013 | Petrou | G06Q 30/0623 705/26.61 |
| 2014/0028712 A1* | 1/2014 | Keating | A63F 13/428 345/633 |
| 2014/0058893 A1* | 2/2014 | Cazanas | H04W 4/80 705/26.7 |
| 2014/0100996 A1* | 4/2014 | Klein | G06T 1/00 705/27.2 |
| 2014/0100997 A1* | 4/2014 | Mayerle | G06T 19/006 705/27.2 |
| 2014/0143105 A1* | 5/2014 | Shaw | G06Q 20/3278 705/30 |
| 2014/0152847 A1* | 6/2014 | Zomet | G06Q 30/0629 348/222.1 |
| 2014/0297462 A1* | 10/2014 | Boone | G06Q 30/0623 705/26.8 |
| 2016/0098755 A1* | 4/2016 | Silvestro | G06Q 30/0258 705/14.58 |

\* cited by examiner

SYSTEMS AND METHODS FOR LISTING AN ITEM

BACKGROUND

The typical lifecycle of a product is that a buyer purchases an item, and then keeps it until it is gifted, donated or sold to a new owner or it is thrown away (because the item was no longer usable, or the buyer had no other options). When product owners attempt to resell products on any type of online platform, they typically face difficulties in creating the listing, identifying the appropriate time to sell, and setting an optimal listing price. Creating an appropriate listing can be difficult without access to necessary product information. Timing the listing and setting a price depend on a number of factors that may be difficult for a seller to ascertain. It would be desirable to provide systems and methods that increase the likelihood that products are sold for the greatest potential value.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
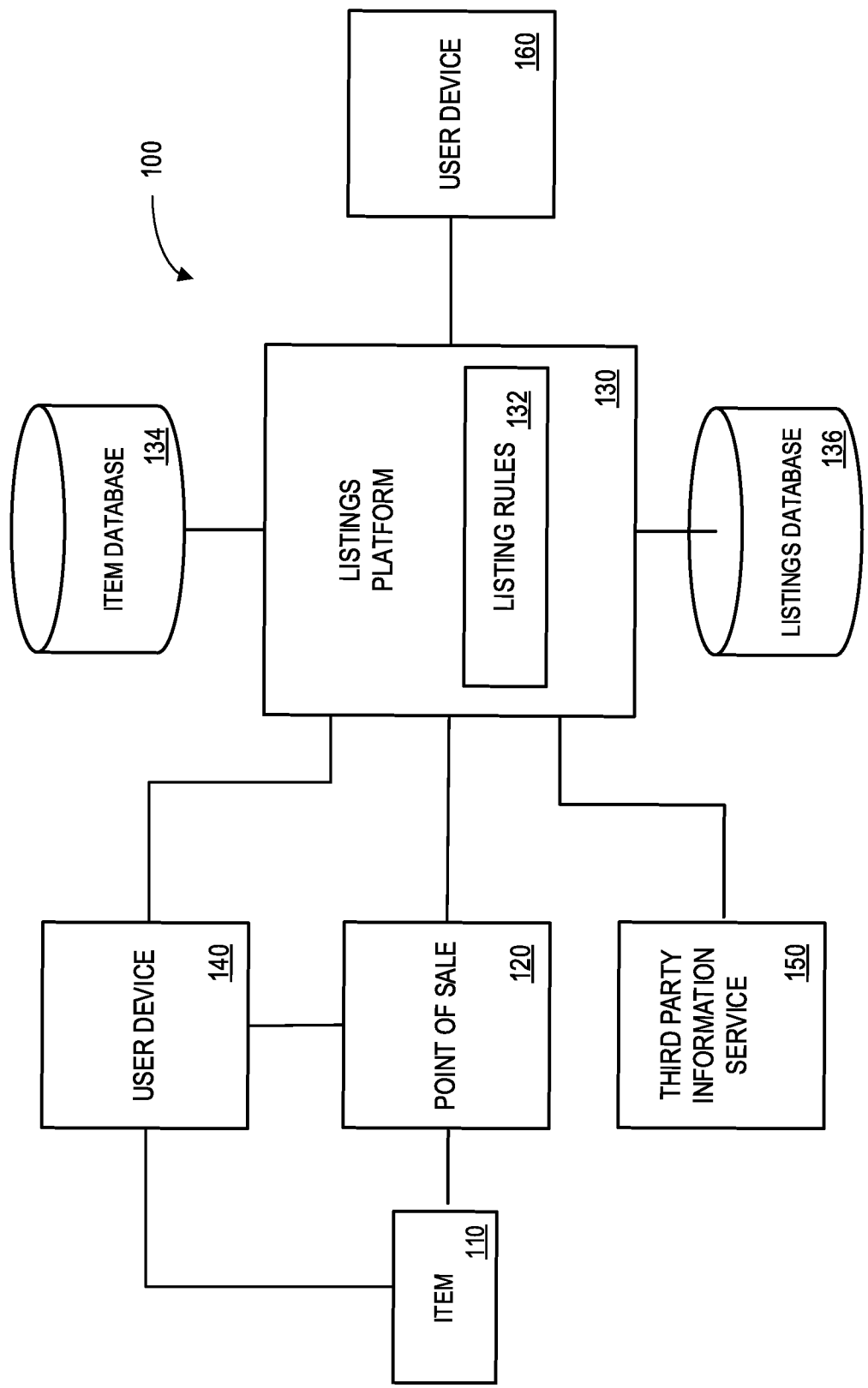
FIG. 1 is a diagram illustrating a system for posting and disposing of an item in accordance with some embodiments.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, details are set forth to provide a thorough understanding of various example embodiments. It should be appreciated that modifications to the embodiments will be readily apparent to those skilled in the art upon reading this description, and generic principles defined herein may be applied to other embodiments and applications without departing from the spirit and scope of the disclosure. Moreover, in the following description, numerous details are set forth as an explanation. However, one of ordinary skill in the art should understand that embodiments may be practiced without the use of these specific details. In other instances, well-known structures and processes are not shown or described so as not to obscure the description with unnecessary detail. Thus, the present disclosure is not intended to be limited to the embodiments shown but is to be accorded the widest scope consistent with the principles and features disclosed herein.

Frequently, purchasers of a product would like to dispose of the product by reselling it before the product has no value or has otherwise diminished in value to such an extent that it is difficult to sell to a new owner. As described above, unfortunately, in many situations, product owners are left with no viable option other than to dispose of a product for little to no value. Embodiments described herein provide systems and methods which allow product owners to identify desirable points in time at which to sell such products for value as well as to reduce the complexity of listing such products for resale. Some embodiments described herein provide systems and methods which allow product owners to specify one or more listing rules that must be met in order for a product to be listed for resale and once met, will cause a product listing to be created substantially automatically.

Pursuant to some embodiments, systems, methods, apparatus and computer program code are provided to create a listing data record which include analyzing an item data record to identify a geographical area, one or more item details, a user, and at least a first listing rule; determining that a degree of demand for the item in the geographical area is currently high; determining that the at least first listing rule is satisfied and converting the item data record into a listing data record, allowing the listing record to be viewed by a plurality of users interested in the item. The item details may be obtained from either a point of sale device or a user device operated by the user.

Pursuant to some embodiments, prior to converting the item data record into a listing data record, a radio signal is transmitted to a receiver associated with the user informing the user that the degree of demand for the item in the geographical area is currently high. In some embodiments, converting the item data record into a listing data record includes receiving a radio signal from the receiver associated with the user confirming that the user wishes to convert the item data record into a listing data record.

In some embodiments, the degree of demand is determined based on identifying a current demand for the item in the geographical area and identifying a price differential between a price of items similar to the item and an expected price established by the user. The price of items similar to the item may be determined based on analysis of listing and search data.

The result is systems, methods, apparatus and computer program code that allow classified listings to easily be created using accurate information obtained when the item is purchased and which utilize the analysis and collection of data to identify when an item detail record should be converted to a listing data record.

For simplicity and ease of exposition, a number of terms are used herein. For example, the term "product" or "item" are generally used interchangeably when referring to a product or item to be listed for sale using features of the present invention. A "product" or "item" may be any tangible or intangible item that may be sold or conveyed using features of the present invention.

As used herein, the term "classifieds" or "listings" may be used to refer to listings of products for sale via a classifieds or listings platform which allows sellers to advertise their products for resale to buyers. Examples of "classifieds" or "listings" and their related platforms are those provided by portfolio companies of the assignee of the present invention OLX Global BV (shown at www.olxgroup.com), for example. In general, a "listing" may include information identifying the product for sale as well as information about price and some mechanism(s) for completing a purchase of the product.

As used herein, the term "original purchaser" or "seller" is used to refer to the individual or entity that purchased or acquired an item, and who wishes to use features of the present invention to automatically create a subsequent listing when one or more listing rules are met. The original purchaser may not be the first owner of a product or item (e.g., the product or item may be used). The term "subsequent purchaser" or "buyer" will be used to refer to the individual or entity that interacts with a classifieds or listing platform that operates pursuant to the present invention and who purchases a product listed by an original purchaser as described further herein.

As used herein, the terms "item data" or "product data" are used to refer to data associated with an item purchased by an "original purchaser" or "seller". The "item data" or "product data" may include information collected at a point of sale, information entered by the original purchaser, and/or information appended to an item data record from one or more third party information services as will be discussed further herein.

The term "listing data" is used to refer to data associated with a listing on a listing platform. As used herein, "listing data" may be the same as or include "item data" as well as additional information provided by the original purchaser and/or information appended to a listing data record. The additional information or information appended to the listing data record may include information that is received from one or more third party information services as well as information obtained from an entity operating the system of the present invention as will be discussed further herein.

Prior to discussing details of features of the invention, for purposes of illustrating features of some embodiments of the present invention, a simple example will now be introduced and referenced throughout the disclosure. In the illustrative example, a customer (named "John") is purchasing a new television from a retail store. John knows that he may not keep the television forever and that he may someday want to sell it. At the time of purchase at the retail store, John may interact with the system of the present invention to pre-configure a listing to resell the television using a classifieds platform. Information about the television (including, for example, a SKU or other identifier that can be used to specifically identify the make and model of the television, the purchase price, and the purchase date and location—collectively, the "item data") are transmitted to a listings platform for storage in a record associated with an account John has with the listings platform. John can also pre-configure one or more listing rules about how or when he will list the television for resale in the future. For example, John may specify that he wants to list the television for resale after 1 year if there is a high probability that he can resell the television for at least 50% of the original purchase price. John then takes his new television home and enjoys it. Over a year later, John receives a notification from the listings platform (based on the rules that John established earlier) that there is strong demand for his make and model of television and that he will likely be able to resell the television for over 50% of the original purchase price. John responds to the notification confirming that he wishes the listings platform to proceed with a listing to attempt to sell the television. In response, the listings platform automatically posts a listing for the television including details of the television (such as the television's make, model, age and offer price) without any further intervention from John. The result is a system that allows users to maximize the resale value of their purchases with a minimum of user-initiated effort. Users do not need to be experts in pricing or marketing, as embodiments analyze market conditions to identify appropriate timing and pricing to increase the likelihood of a product being sold.

FIG. 1 is block diagram of a system 100 according to some embodiments of the present invention. In particular, the system 100 includes a listings platform 130 that may access one or more databases, including an item database 134 and a listings database 136. The listings platform 130 may be configured to allow users to create listings of products to be sold through the platform 130. Those product listings may be broadcast or made available to potential buyers operating devices such as user device 160. Product listings may be created in several ways. For example, users operating user devices 140, 160 may interact with listings platform 130 to create a new product listing and then publish the listing so that prospective buyers can view the listing by interacting with the listings platform 130. Such an approach to create a product listing is a standard approach used by classifieds platforms such as those offered by the assignee of the present invention. Pursuant to embodiments of the present invention, product listings may be created under control of the listing platform 130 by application of one or more listing rules 132 to convert item data stored in an item database 134 into a listing published by the listings platform 130. In some embodiments, such a listing approach may be performed with little to no human intervention while ensuring postings with greater accuracy and descriptive details, improved pricing and posting timing based on current demand.

For example, pursuant to some embodiments, the listings platform 130 may be configured to allow users to create item data records (stored in item database 134) and to specify one or more listing rules 132 which, if met, cause the item data to be converted into listing data (e.g., such as that stored in listing database 136). The listing rules 132 may be established by users associated with the item data, and the listings platform 130 may be operated to regularly monitor the listing rules 132 to identify situations where the listing rules for a particular item have been met so that the item data can be converted into a listing. Pursuant to some embodiments, listing rules 132 may involve information associated with one or more third party information services 150. For example, in some embodiments, pricing data from third party listing services may be monitored to identify item prices for similar items. In some embodiments, listing rules 132 may involve information associated with an entity operating the system of the present invention. For example, in some embodiments, an entity operating a system of the present invention may gather and analyze information associated with price decay of categories of items sold through a system operated by or on behalf of the entity. The price decay data or models may be used in association with listing rules 132 as described further herein. Pursuant to some embodiments, listing rules 132 may involve information available to the listings platform 130 such as, for example, current pricing of similar items, current demand, inventory of similar products, information associated with the speed at which similar items are sold, or the like. In some embodiments, a metric referred to as the "ETA of Sale" may be calculated to determine that conditions are suitable for a listing of the item. Further details of the ETA of Sale and listing rules will be provided further below.

The listings platform 130 may apply one or more listing rules 132 to the data in the item database 134 in order to convert item data into listings data in listings database 136 as will be described further herein. While a separate item database 134 and listings database 136 are shown, those skilled in the art, upon reading this disclosure, will appreciate that the two databases may be deployed or maintained in a single database (or further, may be deployed in multiple databases). In some embodiments, the conversion of an item record to a listing record may simply include setting a flag or other indicator in an item record. The listings platform 130 is in communication with a number of entities, including, for example, users operating user devices 140, 160. The platform 130 may also be in communication with one or more point of sale devices 120 and one or more third party information services 150.

Figure 2:
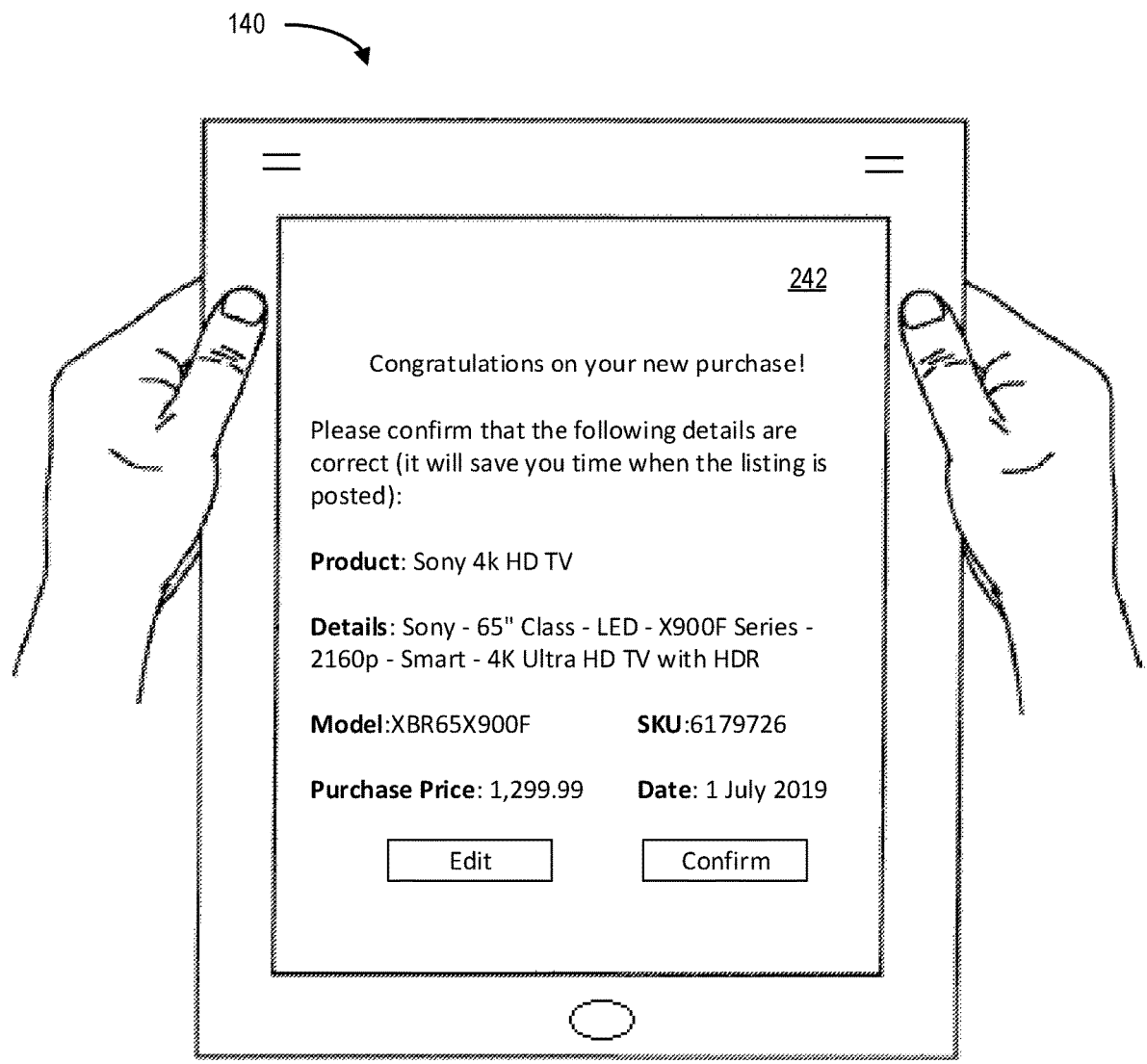
FIGS. 2-4 are examples of user interface displays pursuant to some embodiments.

In general, user device 140 may be operated by a user who purchases one or more items 110 at a point of sale 120 (e.g., such as "John" in the above illustrative example or the "seller"). User device 140 may be operated to capture or receive information from the point of sale 120 for use in creating an item record in an item database 134 associated with listings platform 130. An illustrative user interface showing a user device 140 and a user interface 242 displaying item data from a point of sale 120 which may be used to create an item record is shown in FIG. 2. User device 140 may also be operated by a user to receive information from the listings platform 130 such as information identifying time(s) when it may be desirable to create an item listing in listings database 136 to offer the item 110 for resale. For example, user device 140 may provide a user interface that presents a user with one or more screens that allows the user to set one or more listing rules that govern when a listing should be published for the item 110. A number of different rules may be created to allow a user to control how and when an item will be listed. For example, a user may set a price target as the main rule that must be satisfied before the item will be listed for sale in a classifieds platform.

Figure 3:
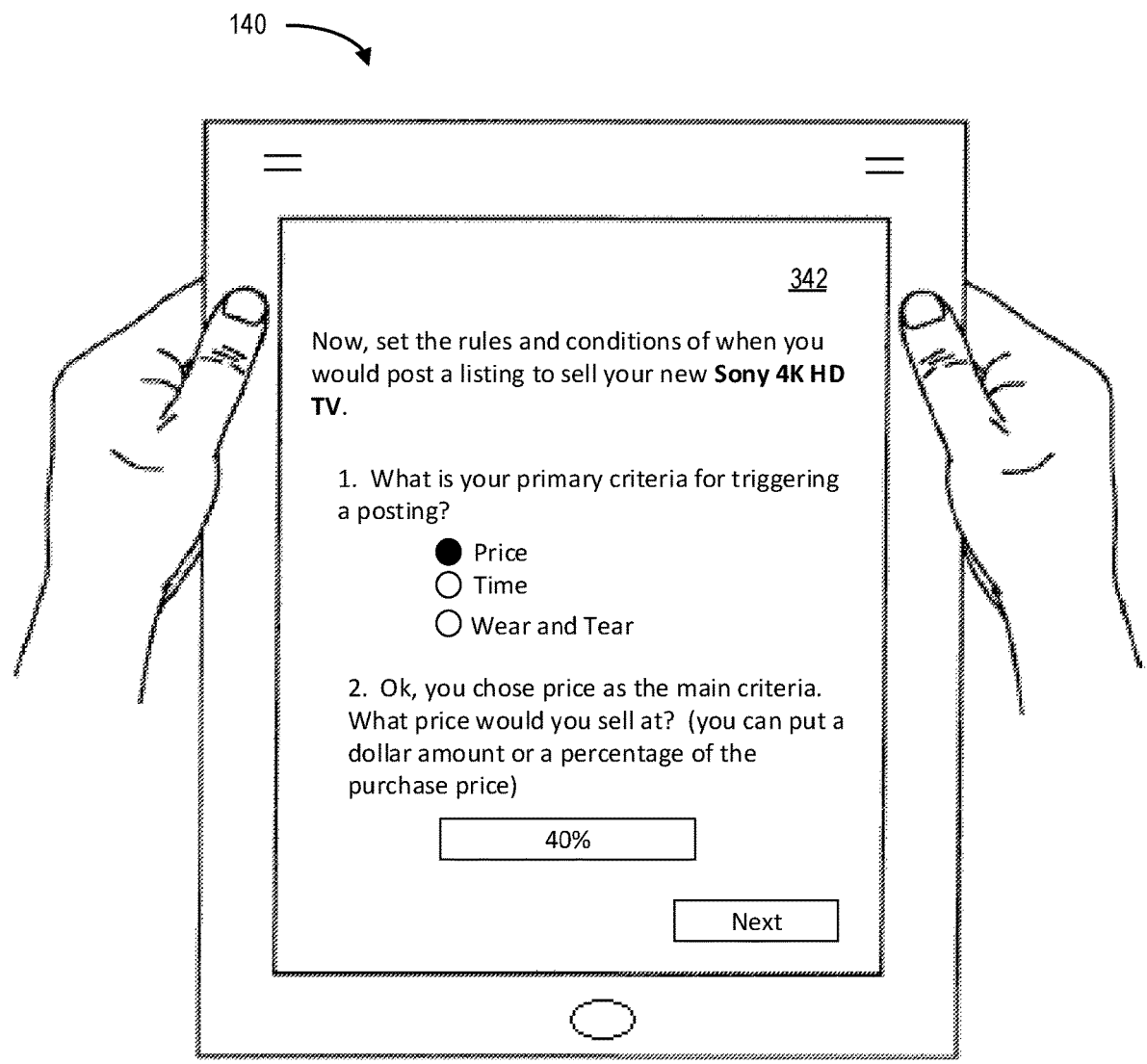
Figure 4:
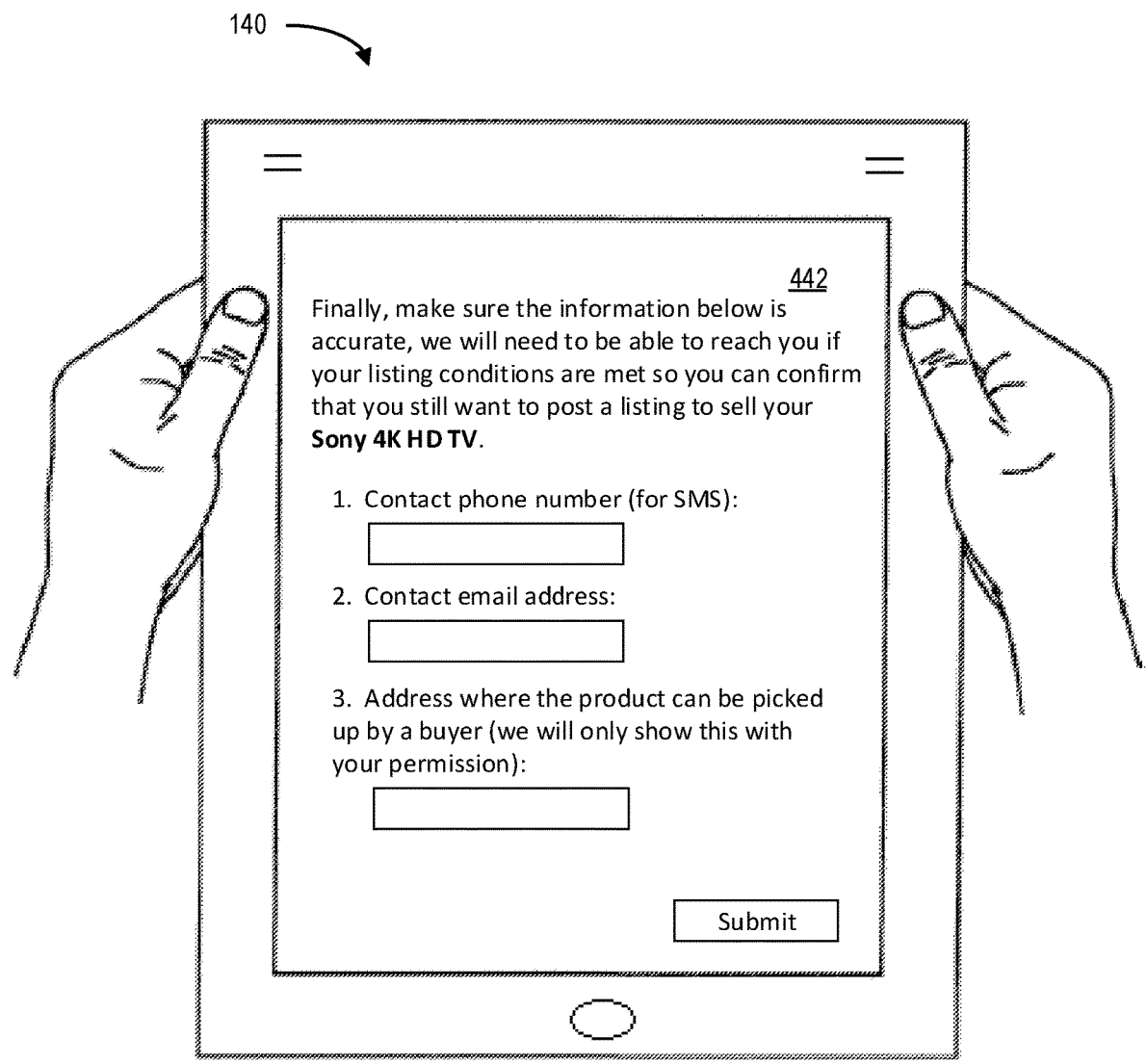

FIG. 3 depicts an illustrative user interface showing a user device 140 and a user interface 342 displaying the creation of one or more listing rules that need to be met in order to create a listing from the item shown in FIG. 2. As shown in FIG. 3, a user may specify one or more criteria or rules to apply before a listing may be created. The user may further operate user device 140 to finalize details associated with the item in the event a listing is eventually created. For example, referring to FIG. 4, the user may operate the user device 140 and interact with a user interface 442 to provide details that may be associated with a listing in order to facilitate completion of a transaction involving the item (e.g., such as contact information or other details that will be provided in or in conjunction with a listing if one is made). The user interfaces of FIG. 4 and other figures described herein are for illustrative purposes only, and a number of configurations of such interfaces may be provided. The user interface of the user device 140, 160 may be associated with an application running on the user device 110 (e.g., such as a classifieds app provided by or on behalf of the listings platform 130) or it may be associated with a Web browser running on the user device 140, 160. Pursuant to some embodiments, the user device 140, 160 may be a computing device having a display, such as, for example, a mobile phone, a watch, a laptop, a tablet computer, a desktop computer, or the like.

User device 160 may be operated by a user (e.g., the "buyer" or "subsequent purchaser") who wishes to interact with listings data provided by listings platform 130 (e.g., to view item data and/or to purchase one or more items). User devices 140, 160 may be used for either function (e.g., they may be used by a "seller" such as the original purchaser of an item 110 at a point of sale 120 and may also be used by a potential buyer operating the device to receive listing information from the platform 130).

The point of sale device 120 may be a physical point of sale device 120 at, for example, a retail store, or it may be a virtual point of sale device 120 at, for example, an Internet retailer or other entity that sells products over the Internet. In some embodiments, the point of sale device 120 provides information about an item 110 so that the item 110 can be added to the item database 134. In some embodiments, the information about the item 110 is provided by the point of sale device 120 to the listings platform 130 (e.g., via an Internet connection). In some embodiments, the information about the item 110 is provided by the point of sale device 120 to the user device 140 so that the user device 140 can provide the information to the listings platform 130.

User devices 140, 160 may be, for example, computing devices (e.g., such as a mobile phone, tablet computer, personal computer or the like) which are configured with an application running on the user device allowing the device to interact with the listings platform 130 over a network (e.g., such as a wireless network connection or the like). The application software may be specially configured to allow interaction with the listings platform 130 (e.g., the software may be a mobile app) or it may be a web browser.

While only individual components are shown in FIG. 1 for convenience, as will become apparent to those skilled in the art upon reading the disclosure, a number of components may be provided pursuant to the present invention. For example, it is likely that a large number of users will operate user devices 140 to cause information to be stored about items 110 and to create listings for such items and a large number of users will operate user devices 160 to view and interact with the listings from the platform 130.

While in some embodiments, user devices 140 are described as computing devices (such as mobile devices, laptop computers, tablet computers, or the like) that are connected to the Internet, in other embodiments, some of the user devices 140 may be configured to send and receive information without accessing the Internet. For example, some user devices 140 may be a radio receiver issued or owned by a user. For example, the radio receiver may be an FM radio which can display some information on its display in addition to playing music or other information. Each radio receiver operating as a user device 140 may be assigned a unique identifier and such unique identifier may be stored in association with the item data. In some embodiments, a radio receiver operating as a user device 140 may receive information from listings platform 130 when an item of the user as been identified as ready to be converted into a listing as described herein. For example, a message may be transmitted to the user's radio receiver indicating that an item of the user is currently sellable. In some embodiments, the radio receiver is also configured to allow the user to transmit a message to the listings platform 130 confirming that the item data should be converted to a listing. In some embodiments, the radio receiver may be connected to the item through Bluetooth or other wireless connection and upon receipt of a message from the listings platform 130, may cause the item (or a device associated with the item) to glow ambiently. Information about the potential listing may also be displayed (such as, for example, the amount at which it could be sold and the degree of demand as will be described further herein).

Figure 5:
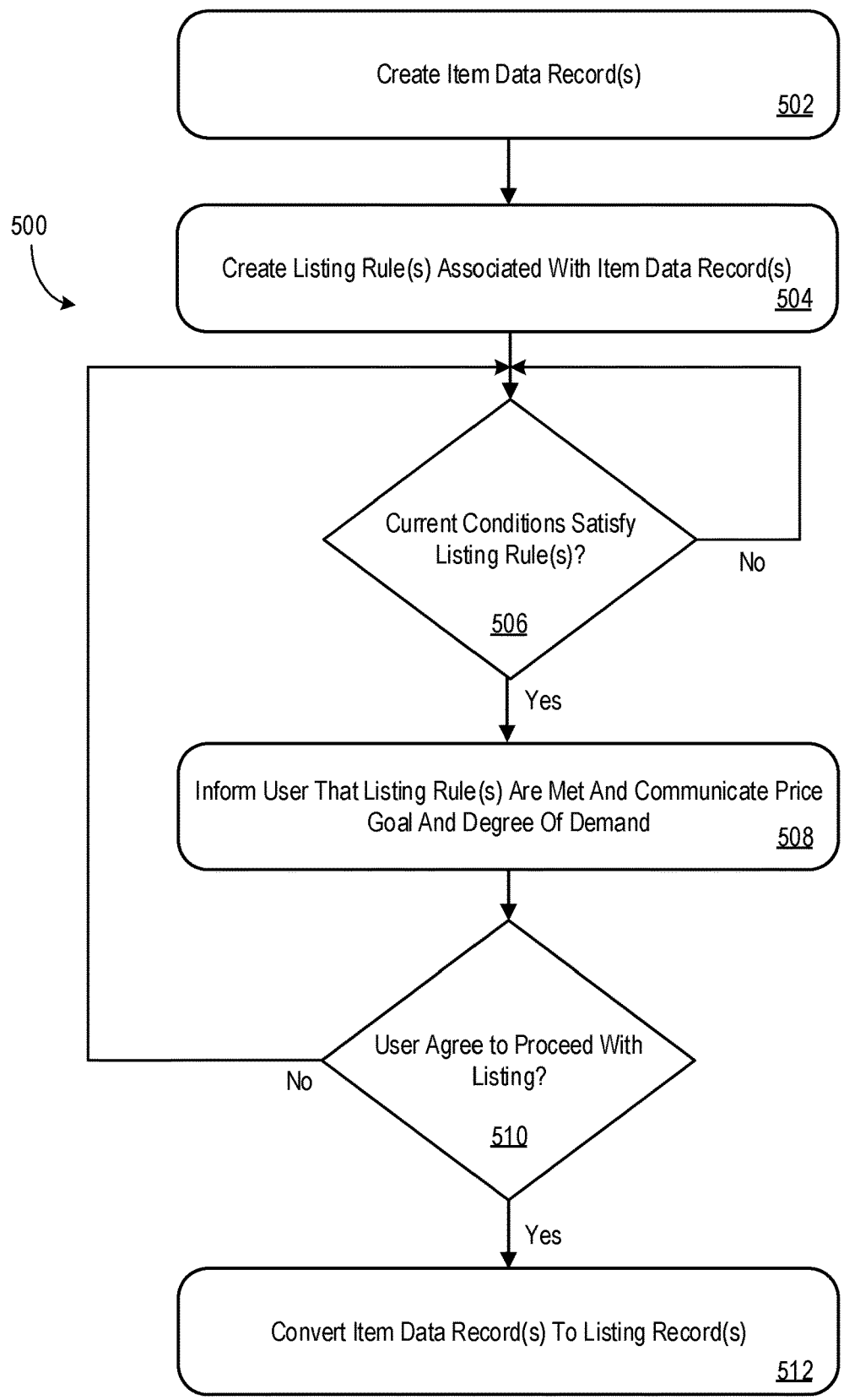
FIG. 5 is a flow diagram illustrating a process for operating a system to automatically create a listing pursuant to some embodiments.

Further details of features of some embodiments will now be described by referring to several flow diagrams that describe processes that may be performed by an application performed by a computing device or a group of computing devices, such as a user device, a web server, a host platform, a cloud computing environment, and the like to implement features of the present invention. Referring to FIG. 5, a process 500 for operating a listings platform to list an item is shown. The process 500 may be performed by platform, such as the listings platform 130 of FIG. 1 interacting with a user device 140 and one or more third party information services 150. In general, the process 500 may begin when (or after) a user purchases an item 110. Process 500 begins at 502 where one or more item data records are created. Item data records may be created in a number of ways. For example, in some embodiments, an item data record may be created substantially automatically in response to a transaction at a point of sale. For example, a point of sale device may be configured to prompt a buyer whether the buyer wishes to create an item data record using information from the point of sale device. The data may be transmitted to listings platform 130 for storage in an item database 134 with information identifying the buyer. As another example, the item data record may be created by a user operating a user device 140. The user device 140 may initiate the creation of the item data record based on, for example, an electronic (or other) receipt received from the point of sale 120 or based on information entered or otherwise captured by the user.

Figure 6:
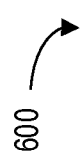
FIG. 6 is a tabular portion of an item database according to some embodiments.

The information to create the item data record may include information used to identify the product or item such as a SKU or other identifier (such as a VIN in the case of a vehicle or an ISBN in the case of a book), a quantity, a purchase price, purchase location and time, and an item description. In some embodiments, the item description may be obtained from one or more third party information services 150 using, for example, the product identifier. The information obtained at 502 is used to create an item data record such as the illustrative (but not limiting) item data records of FIG. 6. FIG. 6 is a tabular portion of an item database such as the item database 134 of FIG. 1.

FIG. 6 depicts a table that represents the item database 134 that may be stored at or accessible to the listings platform 130 according to some embodiments. The table may include, for example, entries identifying items purchased by users of the listings platform 130. The table may also define fields 602, 604, 606, 608, 610 for each of the entries. The fields 602, 604, 606, 608, 610 may, according to some embodiments, specify: an item identifier 602, an associated user identifier 604, an item reference 606, a description 608, and one or more listing rule(s) 610. The item database 600 may be created and updated, for example, based on information received from a buyer and/or that is automatically obtained from a point of sale 120.

The item identifier 602 may be, for example, a unique alphanumeric code identifying an item (e.g., which is used to uniquely identify an item in the item database 134). The user identifier 604 may be, for example, a unique alphanumeric code identifying a user associated with the item. In some embodiments each user has an account associated with the listings platform 130, and the user identifier 604 may be an account identifier. The item reference 606 may be, for example, an identifier that identifies the product, such as a SKU, a VIN, an ISBN or the like.

The description 608 includes information describing the item identified by item identifier 602. The description 608 may be entered by a user, or it may be automatically obtained from a source such as a third party information service 150 based on the item reference 606 (for example, a SKU may be used to retrieve a description of the item). Other attributes of the purchase may also be provided in the description 608 (or in other fields of the database). For example, the purchase price, date and location may be provided.

Referring again to FIG. 5, once the item data has been stored in the item database 134 as one or more item data records, processing continues to 504 where a user interacts with the listings platform 130 to create one or more listing rule(s) associated with the item data record(s) created in 502. In some embodiments, the user may operate a user device 140, 160 to interact with the listings platform 130 to establish and configure the listing rules.

Briefly referring again to FIG. 6, in some embodiments, the listing rule(s) may be stored in item database 134 in association with the item record. The listing rule(s) 610 may include information associated with one or more rules that are to be met in order to convert the item into a listing. For example, rules may include an asking price, an estimated time of sale (indicating how long a product listing is expected to last before a sale occurs), a degree of demand for the product (e.g., how much demand is there for the product in a specific geographical area?), a wear and tear indication (e.g., how much has the product degraded?), or a time metric.

Referring again to FIG. 5, once the listing rule(s) have been configured and saved, processing continues at 506 where the listings platform 130 operates to monitor the listing rules to determine if any of the rules for a particular item are satisfied. This monitoring process may continue until an item data record expires or until a listing rule is satisfied. In some embodiments, a user may specify when a listing rule expires. In some embodiments, the platform 130 may determine that a listing rule should be expired because the listing rule is not capable of being satisfied. For example, a user may have set an unreasonably high listing price which would have a very low probability of success. In such cases, the listings platform 130 may simply expire the item or it may send a notification to the user indicating that the listing rule needs to be modified.

In some embodiments, processing at 506 includes consulting information associated with an "ETA of Sale" calculation. Pursuant to some embodiments, an ETA of Sale is a calculation which takes into account a number of pieces of data associated with an item to determine whether there is current demand for the item and what current resale price may be expected if the item were listed. In some embodiments, the data elements associated with the ETA of Sale calculation may be updated on a regular basis (e.g., such as daily) to continually monitor the demand and pricing of the item. The ETA of Sale will be described by reference to illustrative examples presented in FIG. 7.

Figure 7:
FIG. 7 is a tabular portion of an item monitoring database according to some embodiments.

FIG. 7 depicts a table that represents the item monitoring database (which may be a set of tables or otherwise a part of the item database 134, for example) that may be stored at or accessible to the listings platform 130 according to some embodiments. The table may include, for example, entries identifying resale attributes of items purchased by users of the listings platform 130. The table may also define fields 702-716 for each of the entries. The fields 702-716 may, according to some embodiments, specify: an item identifier 702 and a number of variables that will be described further below. The item monitoring database 700 may be created and updated, for example, based on information collected and/or calculated by the platform 130 about items in the item database 134.

The item identifier 702 may identify a specific item in item database 600 which is being monitored (e.g., using the process of FIG. 5) in order to determine if the item should be converted to a listing. A variable shown as "S" 704 represents the number of times the item has been searched for within a time period (such as, for example, a week) within a search area around the user's geographical location (such as, for example, 10 miles). The value of S 704 may be determined based on search logs of searches from listings platform 130 and/or other search providers. In some embodiments, the item name as well as keywords associated with the item name may be tracked.

A variable shown as "V" 706 represents the average daily page views of an ad for a similar item within a search area around the user's geographical location (such as, for example, 10 miles). The value of V 706 may be determined based on analytics data of listing pages on listings platform 130 and/or other classified platform providers. A variable shown as "C" 708 represents a count of similar ads currently on the listings platform 130 for the same item (or similar items in the same category and geographical area). A variable shown as "P" 710 represents the average price of similar items sold in the same search area in a recent period of time (e.g., such as four weeks). The value of P 710 may be determined based on data from listings platform 130 and/or other classified platform providers.

A variable shown as "Av" 712 represents the average price decay due to depreciation of the item 702 at any time (t). The price decay variable Av 712 may be determined based on historical data, and further, may be modeled using a predictive model. For example, an entity operating a listings platform 130 may gather data associated with items sold in a category (or even at a SKU level if sufficient data on a SKU is available) to identify the decay in price of products in the category (or with the SKU). The model may further be localized to a specific geographical area or region. A variable shown as "E" 714 represents an expected price of resale of the item 702. The value of E 714 may be calculated as will be discussed further below. A variable shown as "I" 716 represents an initial price.

The data in the table 700 may be used to calculate information allowing accurate identification of when an item should be converted into a listing. For example, the current demand for an item may be determined by calculating [S*V/C]. The degree of demand at a point in time (t) may be calculated based on the current demand as well as a price differential (comparing the expected price with a recent price obtained for the item). That is, the degree of demand at a time (t) is =[S*V/C]*[P−E]. This calculation may indicate that an item should be listed when the degree of demand is >=0. The greater the degree of demand, the greater the chance that an item may be sold. Referring to FIG. 7, the item shown as item ID 11234 (the television) has a very high degree of demand (there is demand as shown by the number of searches and ad views) and there is also a nice surprise—there has recently been a sale of a similar item for $100 more than the expected sale price. Based on the relatively high value of the degree of demand, the user associated with the item ID1234 may want to convert the item to a listing. The second item of FIG. 7 is not faring as well, as there is a degree of demand that is less than 0.

If processing at 506 indicates that one or more listing rules associated with an item have been met (i.e., current conditions satisfy the listing rule(s)), processing continues at 508 where the listings platform 130 is operated to inform the user that listing rule(s) have been met. The user may be informed via an email, text message or some other notification transmitted to the user's user device 140. The notification may include information about the specific item as well as information about the asking price recommended by the listings platform 130 as well as information about the relative degree of demand for the item in the user's geographical area (e.g., such as medium, high or very high). If the user wishes to confirm the listing, he may simply respond to the notification or click a button or link associated with the notification. Alternatively, if the user does not wish to confirm the listing, he may simply ignore the notification (in which case the transaction will cancel or expire) or respond to the notification or click a decline button or link associated with the notification. If the user declines, processing reverts to 506 and the listings platform 130 continues to monitor conditions to identify further rule compliance.

In embodiments where the user device 140 is a radio receiver, processing at 508 may include broadcasting a radio signal with the user's receiver identifier as well as information about the item, the degree of demand, and the expected price. The radio signal is received at the user's radio receiver and is displayed on a display screen of the receiver. The user can agree to proceed with the listing by either causing a response to the radio signal to be transmitted or by otherwise interacting with the listings platform 130 to proceed.

In the case where the user wishes to confirm the listing, processing continues at 512 where the listings platform 130 is operated to convert the item data record(s) into corresponding listing record(s). An illustrative, but not limiting, example of listing records that correspond to the item records shown in FIG. 6 are shown in FIG. 8.

Figure 8:
FIG. 8 is a tabular portion of a listing database according to some embodiments.

FIG. 8 depicts a table that represents the listing database 136 that may be stored at or accessible to the listings platform 130 according to some embodiments. The table may include, for example, entries identifying individual listings of items to be sold on the listings platform 130. The table may also define fields 802, 804, 806, 808, 810 for each of the entries. The fields 802, 804, 806, 808, 810 may, according to some embodiments, specify: a listing identifier 802, an associated user identifier 804, an associated item identifier 806, a listing description 808, and listing details 810. The listing database 800 may be created and updated, for example, based on an indication that one or more listing rules have been met for an item stored in item database 134. Once a rule has been met, the item data is converted into listing data. This conversion may include obtaining data from one or more third party information services 150 as well as data from the listings platform 130.

The listing identifier 802 may be, for example, a unique alphanumeric code identifying a specific listing (e.g., which is used to uniquely identify the listing in the listing database 136). The user identifier 804 may be, for example, a unique alphanumeric code identifying a user associated with the listing (and generally obtained from the item database 134). In some embodiments each user has an account associated with the listings platform 130, and the user identifier 804 may be an account identifier. The item identifier 806 may be, for example, the identifier that identifies the item or product from the item database 134.

The listing description 808 may include information that will form the basis of the classifieds posting or listing that is made available to prospective buyers who interact with the listings platform 130 (e.g., via user devices 160). Embodiments ensure that accurate information is included in the listing by using details from the item database 134 about the product. For example, in some embodiments a SKU (from the item reference 606 of FIG. 6, for example) may be used to retrieve a full product description (and even a picture if desired) from the manufacturer's website or other trusted product information services. Further, links may be formed and included which allow a prospective buyer to view rating or performance data associated with the product. In some embodiments, once the listing has been created, the seller may be given an opportunity to edit the listing description 808 (e.g., to include photos of the actual item or to provide other informative descriptive information).

The listing details 810 may include details of the proposed offer for sale of the item, including the asking price and the geographical location of the item. Other information may be provided such as information about how to pick up or have the product delivered or the like. Pursuant to some embodiments the price is calculated by the listings platform 130 using information about current market conditions in the geographical area of the seller. The market conditions and price may be determined based on information known to the listings platform 130 (e.g., the average sales price of similar items in the geographical area) and/or on information obtained from third party information services 150 (e.g., the average listing price of the item on other classified platforms).

Pursuant to some embodiments, once an item record has been converted into a listing record, the listing record may be made available to potential buyers associated with the listings platform 130. In some embodiments, certain potential buyers may be targeted or informed of the listing proactively as those potential buyers may have expressed some interest in the item. For example, pursuant to some embodiments, potential buyers who have previously searched for an item in the same category (or the same item) may be notified of the new listing. As another example, pursuant to some embodiments, potential buyers who have interacted with sellers of similar items (in the same category or the same item) may be notified of the new listing. Such proactive notifications may be used to ensure that the item is disposed of more quickly.

Embodiments described herein may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 9:
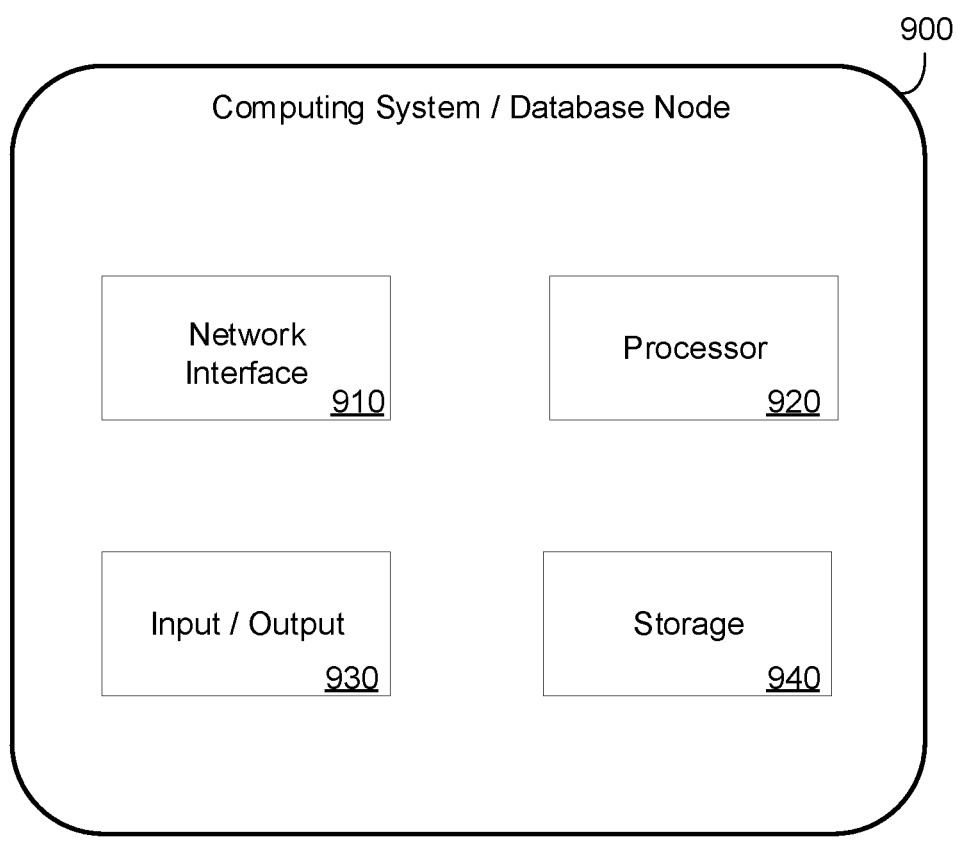
FIG. 9 is a diagram illustrating a computing system for use in the example embodiments described herein.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. For example, FIG. 9 illustrates an example computing system 900 which may represent or be integrated in any of the above-described components, etc. FIG. 9 is not intended to suggest any limitation as to the scope of use or functionality of embodiments described herein. The computing system 900 is capable of being implemented and/or performing any of the functionality set forth hereinabove.

The computing system 900 may include a computer system/server, which is operational with numerous other general-purpose or special purpose computing system environments or configurations. Examples of well-known computing systems, environments, and/or configurations that may be suitable for use as computing system 900 include, but are not limited to, personal computer systems, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, databases, and the like, which may include any of the above systems or devices, and the like.

The computing system 900 may be described in the general context of computer system-executable instructions, such as program modules, being executed by a computer system. Generally, program modules may include routines, programs, objects, components, logic, data structures, and so on that perform particular tasks or implement particular abstract data types. The computing system 900 may be practiced in distributed cloud computing environments where tasks are performed by remote processing devices that are linked through a communications network. In a distributed cloud computing environment, program modules may be located in both local and remote computer system storage media including memory storage devices.

Referring to FIG. 9, the computing system 900 is shown in the form of a general-purpose computing device. The components of computing system 900 may include, but are not limited to, a network interface 910, one or more processors or processing units 920, an output 930 which may include a port, an interface, etc., or other hardware, for outputting a data signal to another device such as a display, a printer, etc., and a storage device 940 which may include a system memory, or the like. Although not shown, the computing system 900 may also include a system bus that couples various system components including system memory to the processor 920.

The storage device 940 may include a variety of computer system readable media. Such media may be any available media that is accessible by computer system/server, and it may include both volatile and non-volatile media, removable and non-removable media. System memory, in one embodiment, implements the flow diagrams of the other figures. The system memory can include computer system readable media in the form of volatile memory, such as random-access memory (RAM) and/or cache memory. As another example, storage device 940 can read and write to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, storage device 940 may include at least one program product having a set (e.g., at least one) of program modules that are configured to carry out the functions of various embodiments of the application.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Although not shown, the computing system 900 may also communicate with one or more external devices such as a keyboard, a pointing device, a display, etc.; one or more devices that enable a user to interact with computer system/server; and/or any devices (e.g., network card, modem, etc.) that enable computing system 900 to communicate with one or more other computing devices. Such communication can occur via I/O interfaces. Further, computing system 900 can communicate with one or more networks such as a local area network (LAN), a general wide area network (WAN), and/or a public network (e.g., the Internet) via network interface 910. As depicted, network interface 910 may also include a network adapter that communicates with the other components of computing system 900 via a bus. Although not shown, other hardware and/or software components could be used in conjunction with the computing system 900. Examples include, but are not limited to: microcode, device drivers, redundant processing units, external disk drive arrays, RAID systems, tape drives, and data archival storage systems, etc.

Pursuant to some embodiments, the computing system 900 may be a user device (e.g., such as a mobile phone, tablet computer, personal computer or the like) operated to display item detail data and listing rules to a user (in the event the user is acting as a seller) and display listing data to a user as described herein (in the event the user is acting as a buyer).

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described regarding specific examples, it should be understood that various changes, substitutions, and alterations apparent to those skilled in the art can be made to the disclosed embodiments without departing from the spirit and scope of the disclosure as set forth in the appended claims.

What is claimed is:

1. A method for creating a listing data record, comprising:
receiving, by a network interface of a listings platform server, a first signal transmitted via a device network interface of a point of transaction device, the signal comprising an item data record for an item purchased, the point of transaction device being located at a location where one or more sales are conducted, the point of transaction device being distinct from the listings platform server;
receiving, by the network interface of the listings platform, a second signal transmitted from a user device associated with a user to the listings platform, the second signal indicating at least a first listing rule, the at least the first listing rule indicating a threshold degree of demand for the item;
analyzing, by a processor of the listings platform server, the received first and second signals to identify an item detail, the user, and the at least the first listing rule, at least a portion of the item data record created upon receipt of information from the user device and from the point of transaction device at a time of purchase of the item;
determining, by the processor of the listings platform server analyzing listing data associated with similar items, whether a current degree of demand for the item is greater than the threshold degree of demand set by the user, wherein the current degree is demand is determined based, at least in part, on a calculation of $[S*V/C]$, where "S" comprises number of times that the item has been searched for within a particular period of time, "V" comprises an average number of daily page views of advertisements for at least one similar item within a particular search area around the user's geographical location, and "C" comprises a count of a number of similar advertisements on the listings platform for the same item or similar items;
determining, by the processor of the listings platform server, whether the at least first listing rule is satisfied at least partially in response to the determination that the current degree of demand is greater than the threshold degree of demand;
automatically converting, by the processor of the listings platform server, the item data record into a listing data record stored in a database associated with the listings platform server in response to determining that the at least the first listing rule is satisfied; and
publishing, by the listings platform server transmitting a third signal via the network interface, the listing data record to enable the listing record to be viewed by one or more user interfaces of a plurality of users interested in the item.

2. The method of claim 1, further comprising:
prior to converting the item data record into a listing data record, transmitting a draft of the listing data record to the user for approval.

3. The method of claim 1, further comprising:
prior to converting the item data record into a listing data record, transmitting a radio signal to a receiver associated with the user informing the user that the degree of demand for the item is currently greater than the threshold.

4. The method of claim 3, wherein the converting the item data record into a listing data record further comprises:
receiving a radio signal from the receiver associated with the user confirming that the user wishes to convert the item data record into a listing data record.

5. The method of claim 1, wherein the item data record is created based on information received from one of a point of sale device and a user device operated by the user.

6. The method of claim 1, wherein the item detail includes at least an item identifier and an item description.

7. The method of claim 1, wherein the user is a user having an account with a listings platform, the account allowing the creation of item data records at the listings platform on behalf of the user.

8. The method of claim 6, further comprising:
identifying one or more keywords associated with the item identifier; and
identifying one or more categories associated with the item identifier.

9. The method of claim 8, wherein the determining the current degree of demand for the item further comprises:
identifying a price differential between a price of items similar to the item identified by the item identifier and an expected price established by the user.

10. The method of claim 9, wherein the current degree of demand for the item exceeds the threshold if the current demand multiplied by the price differential is a positive number.

11. The method of claim 9, wherein the identifying a current degree of demand for the item in the geographical area further comprises:
obtaining a count of searches of the keywords associated with the item identifier in the geographical area during a time period;
obtaining a count of page views of advertisements of similar items during the time period;
obtaining a count of advertisements of similar items during the timer period; and
identifying the current degree of demand based on the count of searches, the count of pageviews and the count of advertisements.

12. The method of claim 9, wherein the items similar to the item identified by the item identifier are items in the same category and having a similar age in the geographical area.

13. The method of claim 9, wherein the expected price is determined based on the at least first listing rule.

14. The method of claim 9, wherein the expected price is determined at least in part using at least one of an age decay function for the category and an average depreciation decay function for the category.

15. The method of claim 14, wherein at least one of the age decay function and the average depreciation decay function is a dynamic decay function calculated by a model.

16. The method of claim 15, wherein the model is a pricing decay curve for the category, the model generated based on information about completed transactions in the category.

17. The method of claim 16, wherein the information about completed transactions in the category are obtained by analyzing messages between buyers and sellers on the listings platform to determine a final sale price of items in the category.

18. A non-tangible, computer-readable medium storing instructions, that, when executed by a processor, cause the processor to perform a method to create a listing data record, the method comprising:
receiving, by a network interface of a listings platform server, a first signal transmitted via a device network interface of a point of transaction device, the signal comprising an item data record for an item purchased, the point of transaction device being located at a location where one or more sales are conducted, the point of transaction device being distinct from the listings platform server;
receiving, by the network interface of the listings platform, a second signal transmitted from a user device associated with a user to the listings platform, the second signal indicating at least a first listing rule, the at least the first listing rule indicating a threshold degree of demand for the item;
analyzing, by a processor of the listings platform server, the received first and second signals to identify an item detail, the user, and the at least the first listing rule, at least a portion of the item detail provided from the user device and from the point of transaction device at a time of purchase of the item;
determining, by the processor of the listings platform server analyzing listing data associated with similar items, whether a current degree of demand for the item is greater than the threshold degree of demand set by the user, wherein the current degree is demand is determined based, at least in part, on a calculation of [S*V/C], where "S" comprises number of times that the item has been searched for within a particular period of time, "V" comprises an average number of daily page views of advertisements for at least one similar item within a particular search area around the user's geographical location, and "C" comprises a count of a number of similar advertisements on the listings platform for the same item or similar items;
determining, by the processor of the listings platform server, whether that the at least first listing rule is satisfied at least partially in response to the determination that the current degree of demand is greater than the threshold degree of demand;
automatically converting, by the processor of the listings platform server, the item data record into a listing data record stored in a database associated with the listings platform server in response to determining that the at least the first listing rule is satisfied; and
publishing, by the listings platform server transmitting a third signal via the network interface, the listing data record to enable the listing record to be viewed by one or more user interfaces of a plurality of users interested in the item.

19. A system to create a listing data record, comprising:
(a) a first communication port to receive information associated with a user interacting with a user device to identify an item detail and at least a first listing rule, the at least first listing rule including a threshold set by the user, the item detail including information identifying an item purchased using a point of sale device in a transaction involving the user and a merchant;

(b) a listings platform, coupled to the first communication port, including a computer processor and a memory storing instructions to cause the computer processor to:
  (i) upon receiving a signal comprising the item detail and the at least first listing rule at the first communication port, create an item data record for an item purchased, the item data record including information identifying the user, the item detail and the at least first listing rule, the at least the first listing rule indicating a threshold degree of demand for the item,
  (ii) automatically monitor transactions involving items similar to the item,
  (iii) determine a current degree of demand for the item, wherein the current degree is demand is determined based, at least in part, on a calculation of [S*V/C], where "S" comprises number of times that the item has been searched for within a particular period of time, "V" comprises an average number of daily page views of advertisements for at least one similar item within a particular search area around the user's geographical location, and "C" comprises a count of a number of similar advertisements on the listings platform for the same item or similar items
  (iv) in response to determining that the current degree of demand for the item is greater than the threshold degree of demand set by the user,
    (1) automatically convert the item data record into a listing data record, and
    (2) publish the listing data record, by transmitting a signal via the first communication port, to enable the listing record to be viewed by a plurality of users interested in the item;

wherein the point of sale device is associated with a merchant which is distinct from the listings platform.

20. The system of claim 19 wherein the current degree of demand for the item is determined to be greater than the threshold set by the user if the current demand multiplied by the price differential is a positive number.

* * * * *